US008893595B2

(12) United States Patent
Wu

(10) Patent No.: US 8,893,595 B2
(45) Date of Patent: Nov. 25, 2014

(54) CHUCK DEVICE HAVING TWO COLLETS

(71) Applicant: Hsuan-Lung Wu, Taichung (TW)

(72) Inventor: Hsuan-Lung Wu, Taichung (TW)

(*) Notice: Subject to any disclaimer, the term of this patent is extended or adjusted under 35 U.S.C. 154(b) by 171 days.

(21) Appl. No.: 13/750,525

(22) Filed: Jan. 25, 2013

(65) Prior Publication Data
US 2014/0210168 A1 Jul. 31, 2014

(51) Int. Cl.
*B23B 31/12* (2006.01)
*B23B 31/20* (2006.01)

(52) U.S. Cl.
CPC .................................... *B23B 31/204* (2013.01)
USPC .............................. 82/162; 82/123; 279/4.07

(58) Field of Classification Search
CPC ........ B23B 31/04; B23B 31/12; B23B 31/16; B23B 31/20; B23B 31/204; B23B 31/30
USPC ........... 82/123, 162, 165, 149, 169; 279/4.07, 279/4.12
See application file for complete search history.

(56) References Cited

U.S. PATENT DOCUMENTS

| 1,914,984 | A | * | 6/1933 | Smith et al. ..................... 82/117 |
| 3,132,673 | A | * | 5/1964 | Bamford .................... 144/209.1 |
| 4,506,569 | A | * | 3/1985 | Brown et al. .................... 82/117 |
| 5,946,992 | A | * | 9/1999 | Ozawa .............................. 82/48 |
| 6,199,462 | B1 | * | 3/2001 | Hallett ............................. 82/162 |
| 6,945,147 | B2 | * | 9/2005 | Sakashita ......................... 82/149 |
| 7,143,619 | B2 | * | 12/2006 | Morikawa et al. ................ 72/84 |

* cited by examiner

*Primary Examiner* — Will Fridie, Jr.
(74) *Attorney, Agent, or Firm* — Schwegman Lundberg & Woessner, P.A.

(57) ABSTRACT

A chuck device includes front and rear collets, a driving ring, and a driving sleeve. The driving ring and the driving sleeve can be driven hydraulically to move toward or away from each other. When the driving ring and the driving sleeve are moved hydraulically away from each other, each of the front and rear collets is moved to a release position, when the driving ring and the driving sleeve are moved hydraulically toward each other, each of the front and rear collets is moved to a clamping position.

9 Claims, 8 Drawing Sheets

CHUCK DEVICE HAVING TWO COLLETS

BACKGROUND OF THE INVENTION

1. Field of the Invention

This invention relates to a chuck device of a machine tool, and more particularly to a chuck device having two collets that can be driven to operate synchronously.

2. Description of the Related Art

Referring to FIG. 1, a conventional hydraulic chuck device includes a machine frame 30, in which a fixed seat 40, a hydraulic cylinder 50, an inner positioning unit 60, a bearing unit 70, a connecting seat 80, a first oil path control unit 90, a second oil path control unit 95, a driving seat 100, a transmission member 110, a pull rod 120, a front cap 130, a rear cap 140, a front collet 150, a rear collet 160, a front cover 170, and a rear cover 180 are provided. When hydraulic oil is fed into an oil hole 45 in the fixed seat 40, it flows into a hole 89 to push a driving ring 102 of the driving seat 100 so that the driving seat 100 pushes the front cap 130 to move forwardly. Hence, the front collet 150 is activated to hold a workpiece (not shown) to be machined. Since the pull rod 120, which is a single rigid body, is connected between the front and rear collets 150, 160, the front and rear collets 150, 160 can open and close in a synchronous manner, so that operation of the front collet 150 affects adversely smooth operation of the rear collet 160. As a result, the rear collet 160 cannot hold firmly another workpiece (not shown) to be machined. Furthermore, due to the presence of the pull rod 120, the opening degrees of the front and rear collets 150, 160 are the same at a time. In a situation where the front and rear collets 150, 160 hold respectively two portions of a workplace to be machined, which have different diameters, if one of the two portions of the workplace is held firmly within one of the front and rear collets 150, 160, the other of the two portions of the workpiece cannot be held firmly within the other of the front and rear collets 150, 160. Consequently, when the chuck device is operated at a high speed, workpiece sway is caused, thereby affecting adversely the machining precision. Further, the front and rear collets 150, 160 cannot be used to machine two workpieces having different diameters at a time so that, when the workpieces to be machined have different diameters, the production capacity may be reduced.

SUMMARY OF THE INVENTION

An object of this invention is to provide a chuck device that has two collets and that can hold respectively and firmly two workpieces to be machined at a time.

Another object of this invention is to provide a chuck device that can hold firmly two workpieces having different diameters at a time.

According to an aspect of this invention, a chuck device includes front and rear collets, a driving ring, and a driving sleeve. The driving ring and the driving sleeve can be driven hydraulically to move toward or away from each other. When the driving ring and the driving sleeve are moved hydraulically away from each other, each of the front and rear collets is moved to a release position. When the driving ring and the driving sleeve are moved hydraulically toward each other, each of the front and rear collets is moved to a clamping position.

According to another aspect of this invention, machining equipment includes a machine frame, a driving device disposed on the machine frame, the chuck device, and a machining device including two turret units that are disposed on the machine frame and that are aligned with the front and rear collets, respectively. The mounting member of the chuck device is disposed on the machine frame.

Since the front and rear collets are not interconnected by a single rigid body, such as a pull rod used in the above-mentioned prior art, their opening degrees can be different so as to hold respectively and firmly two workpieces of different diameters in a synchronous manner, thereby promoting the production capacity effectively.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
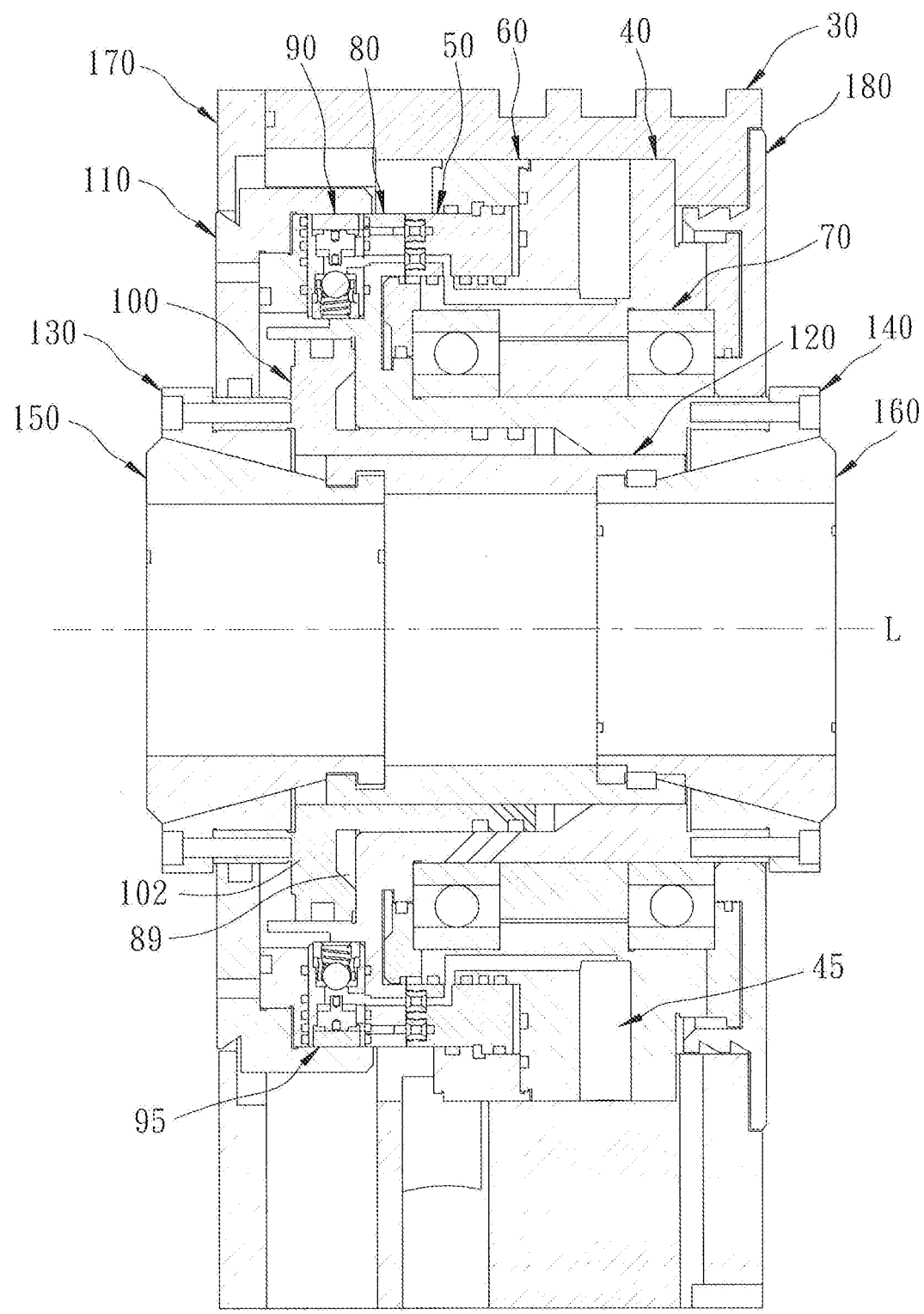
FIG. 1 is a sectional view of a conventional chuck device.
Figure 2:
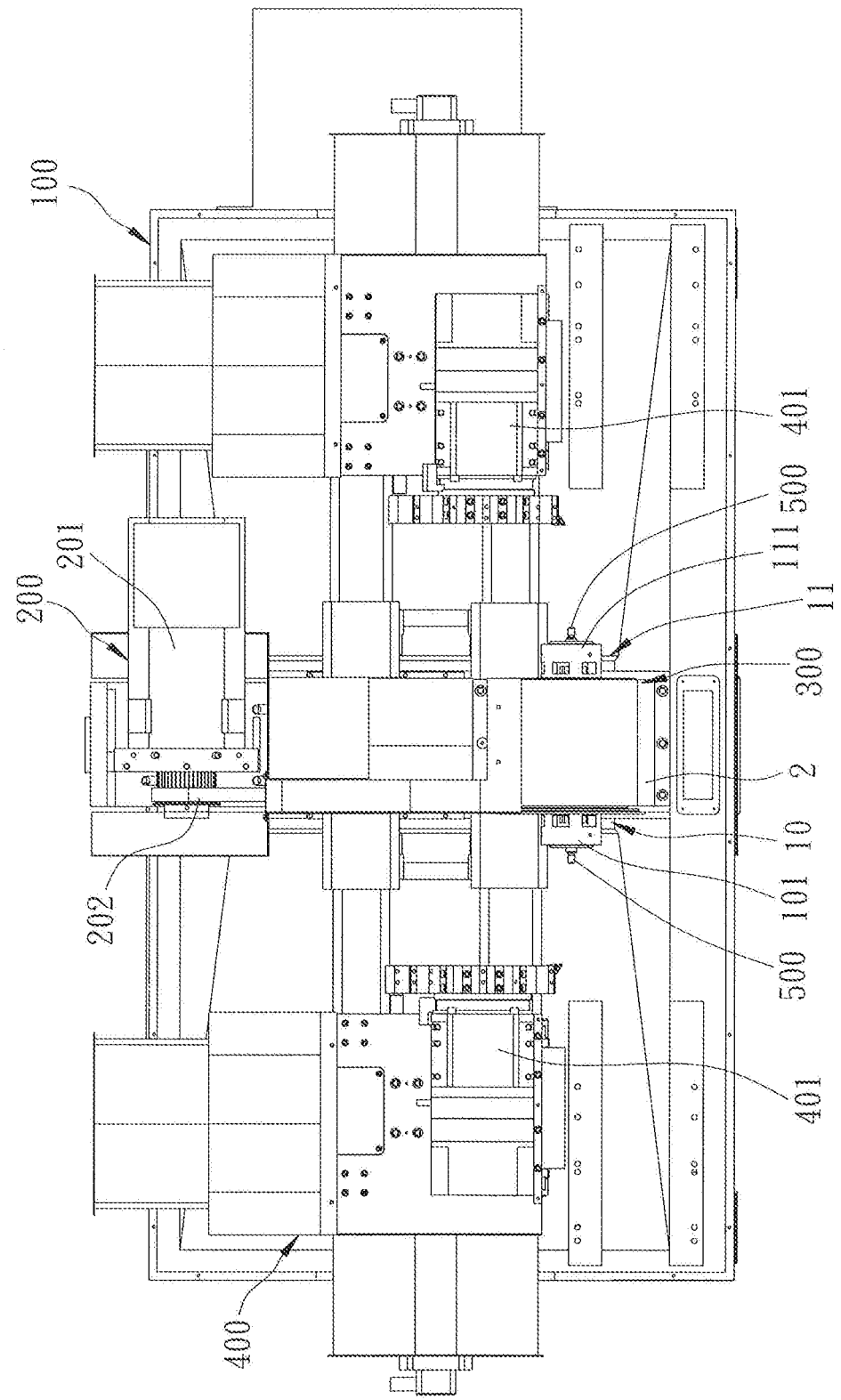
FIG. 2 is a top view of the preferred embodiment of machining equipment according to this invention.
Figure 3:
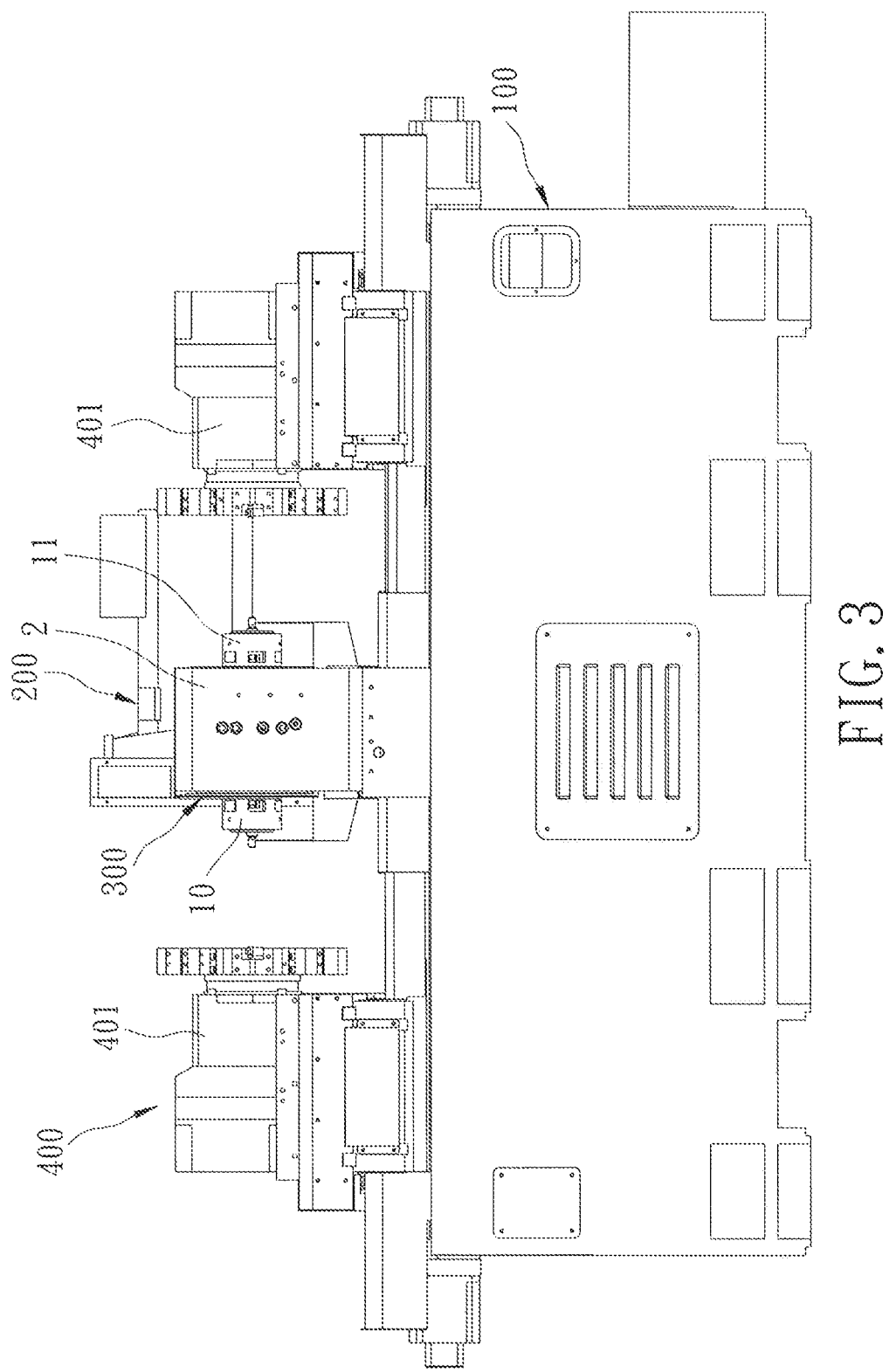
FIG. 3 is a front view of the preferred embodiment.

Referring to FIGS. 2 and 3, the preferred embodiment of machining equipment according to this invention includes a machine frame 100, a driving device 200, a chuck device 300, and a machining device 400.

The driving device 200 is disposed on a middle portion of the machine frame 100, and includes a driving motor 201 disposed on the machine frame 100, and a transmission belt 202 connected between the driving motor 201 and the chuck device 300.

Figure 4:
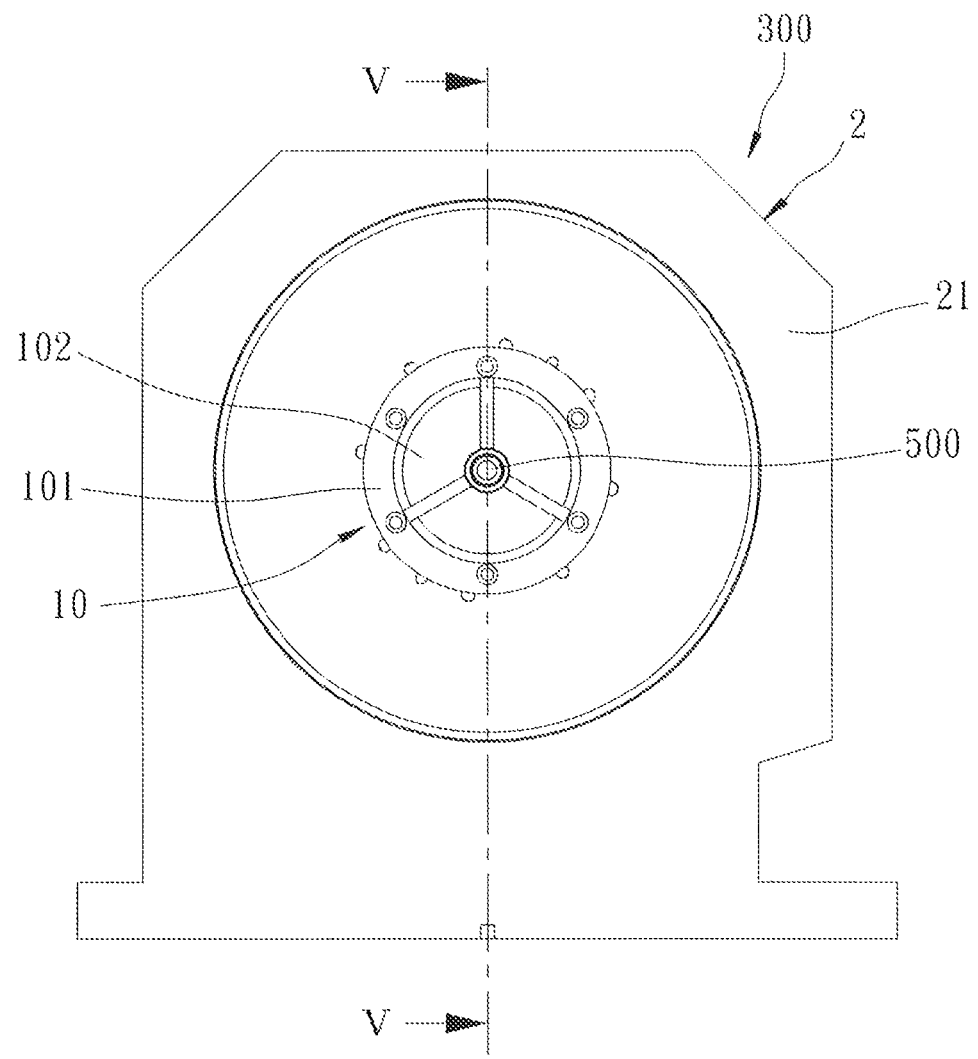
FIG. 4 is a front view of a chuck device of the preferred embodiment.
Figure 5:
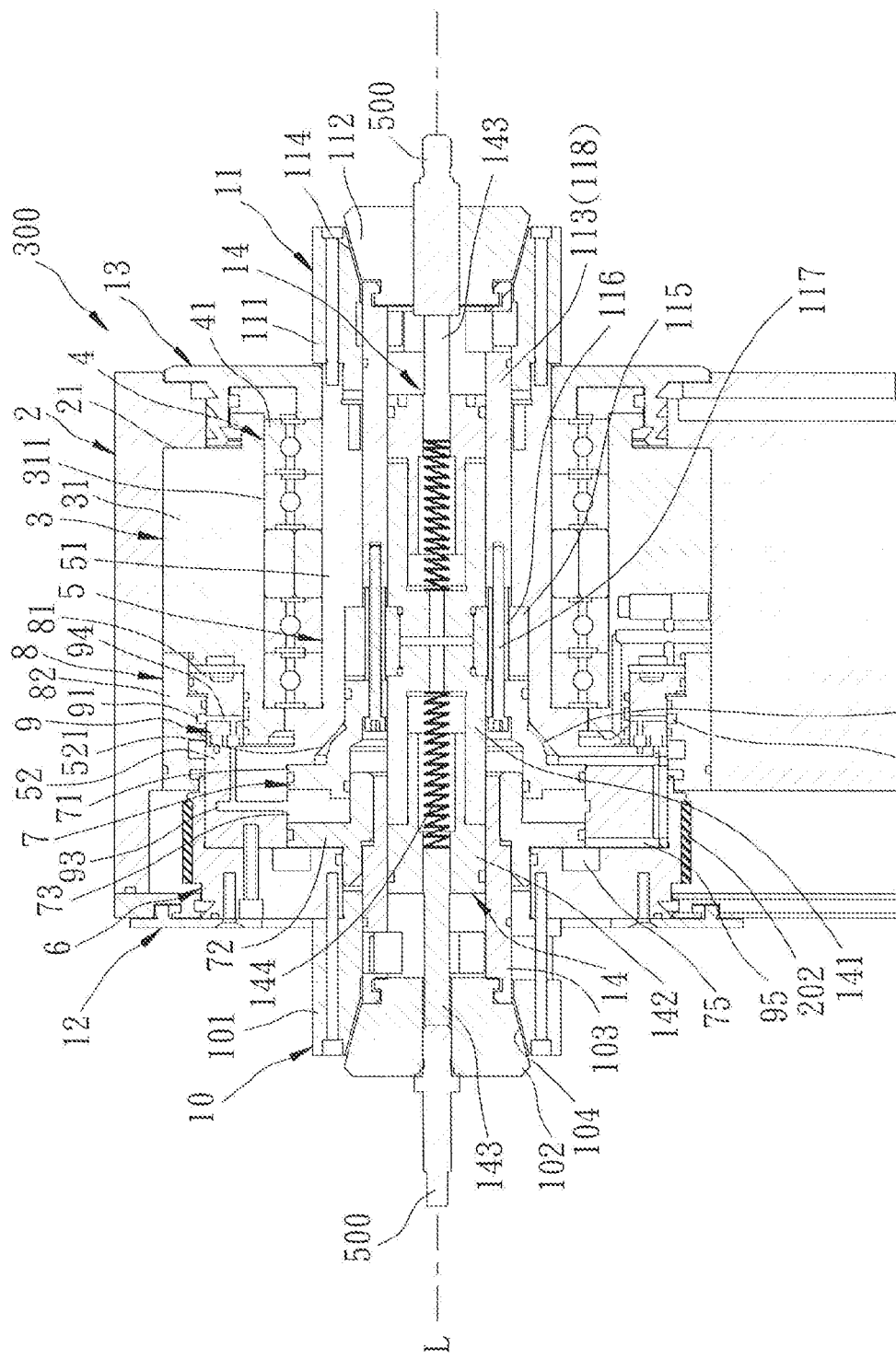
FIG. 5 is a sectional view taken along line V-V in FIG. 4, illustrating that each of front and rear collets is disposed at a release position.
Figure 6:
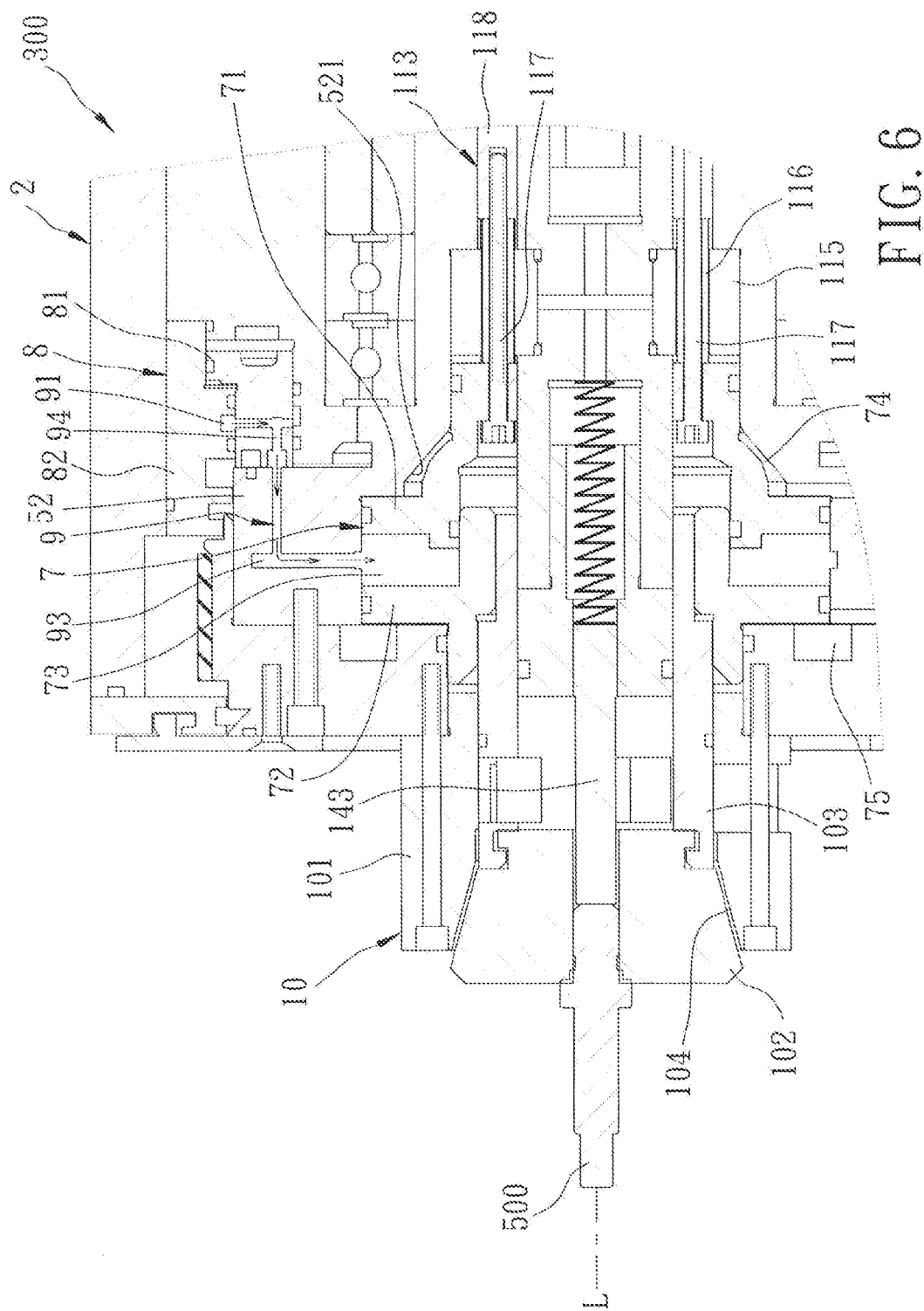
FIG. 6 is an enlarged view of a portion of FIG. 5.

With further reference to FIGS. 4, 5, and 6, the chuck device 300 is disposed on the machine frame 100, and includes a mounting member 2, a fixed seat 3, a bearing unit 4, a connecting member 5, a transmission member 6, a pressure cylinder unit 7, an inner positioning unit 8, an oil path unit 9, a front chuck unit 10, a rear chuck unit 11, a front cover 12, a rear cover 13, and two cutter positioning units 14.

The mounting member 2 is disposed on the machine frame 100, and has an accommodating hole 21 centered at an axis (L).

The fixed seat 3 is disposed within the accommodating hole 21, and has an annular portion 31 centered at the axis (L).

The bearing unit 4 includes a plurality of bearings 41 disposed within the axial hole 311 in the fixed seat 3.

The connecting member 5 includes a rear sleeve 51 extending rotatably through the bearings 41 of the bearing unit 4 along the axis (L), and a ring piece 52 extending forwardly and outwardly from a front end of the rear sleeve 51 and having a tapered inner surface 521.

The transmission member 6 is sleeved on and covers the ring piece 52, and is driven by the belt 202 of the driving device 200 to rotate about the axis (L). In this embodiment, the transmission member 6 is a belt pulley unit.

The press cylinder unit 7 includes a driving sleeve 71 disposed in the connecting member 5 and adjacent to the tapered inner surface 521, and a driving ring 72 disposed within the ring piece 52 and movable relative to the driving sleeve 71. The driving sleeve 71 and the driving ring 72 are movable toward or away from each other along the axis (L). The driving ring 72 cooperates with the ring piece 52 and the driving sleeve 71 to define a first oil chamber 73. The driving sleeve 71 cooperates with the tapered inner surface 521 to define a second oil chamber 74. The driving ring 72 cooperates with the transmission member 6 to define a third oil chamber 75. The inner positioning unit 8 includes an inner cap 81 covering a front end of the ring piece 52, and an outer cap 82 covering the inner cap 81 and the front end of the ring piece 52.

Figure 7:
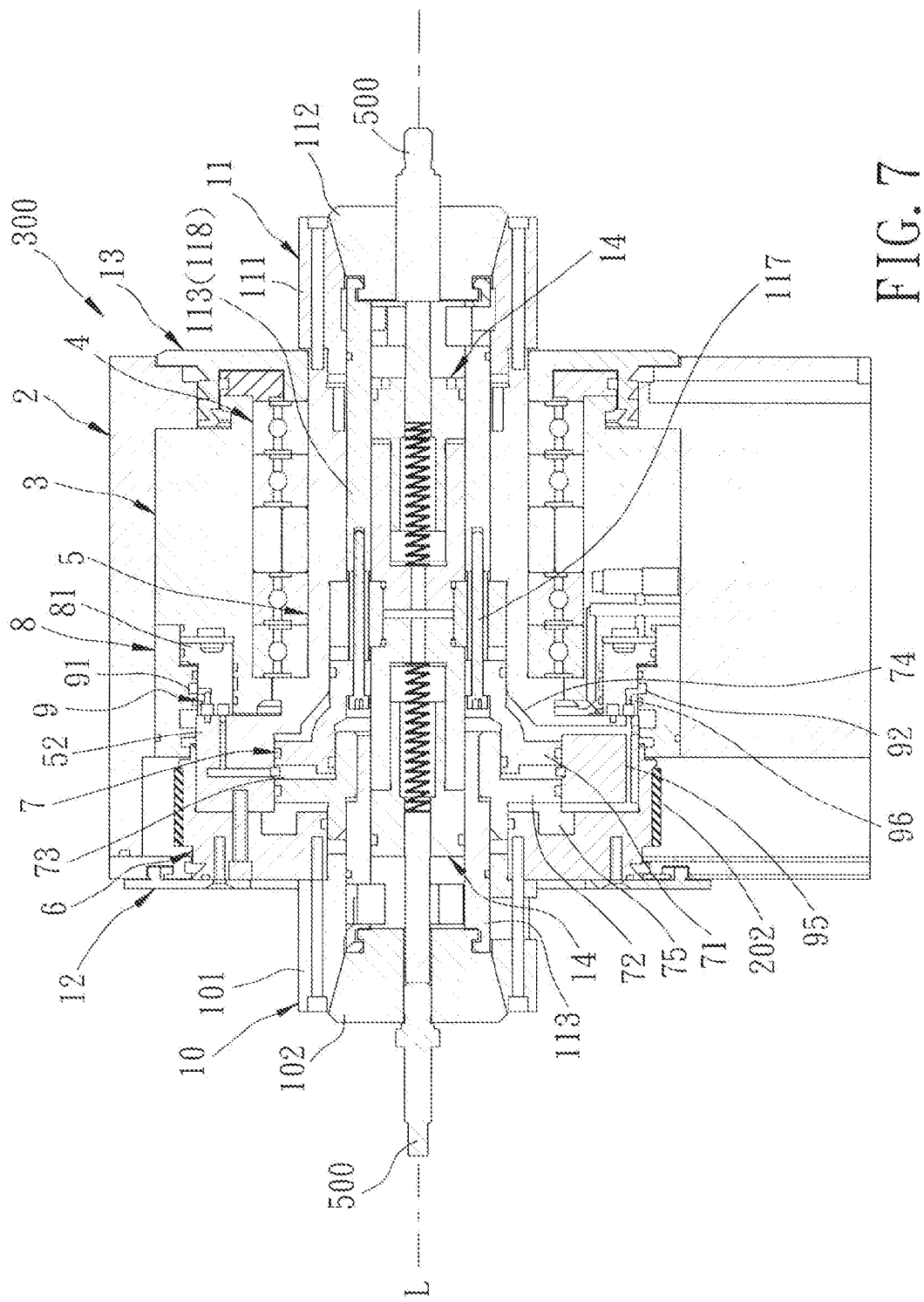
FIG. 7 is a view similar to FIG. 5 but illustrating that each of the front and rear collets is disposed at a clamping position.

With particular reference to FIGS. 5 and 7, the oil path unit 9 includes a first oil hole 91 formed in the outer cap 82, a second oil hole 91 formed in the outer cap 82, a first oil passage 93 formed in the ring piece 52 and in fluid communication with the first oil chamber 73, a second oil passage 94 formed in the inner cap 81 and in fluid communication with the first oil passage 93 and the first oil hole 91, a third oil passage 95 formed in the ring piece 52 and in fluid communication with the second and third oil chambers 74, 75, and a fourth oil passage 96 formed in the inner cap 81 and in fluid communication with the second oil hole 92 and the third oil passage 95.

The front chuck unit 10 includes a front cap 101 disposed on the transmission member 6 and having a tapered front chuck hole 104, a front collet 102 disposed in the front chuck hole 104, and a front connecting tube 103 connected between the front collet 102 and the driving ring 72. Since the front cap 101 and the front collet 102 are well known in the art, further description thereof will be omitted herein for brevity.

With particular reference to FIGS. 5 and 6, the rear chuck unit 11 includes a rear cap 111 disposed on the rear sleeve 51 and having a tapered rear chuck hole 114, a rear collet 112 disposed in the rear chuck hole 114, and a connecting mechanism 113 disposed in the rear sleeve 51 and connected between the driving sleeve 71 and the rear collet 112. Since the rear cap 111 and the rear collet 112 are well known in the art, further description thereof will be omitted herein for brevity. The connecting mechanism 113 includes a fixed ring 115 fixed in the rear sleeve 51, a plurality of equidistant movable sleeves 116 extending movably through the fixed ring 115, a plurality of bolts 117 extending respectively and movably through the movable sleeves 116, and a rear connecting tube 118 having a front end threaded to the bolts 117, and a rear end connected to the rear collet 112.

The front cover 12 is disposed on a front end surface of the mounting member 2.

The rear cover 13 is disposed on a rear end surface of the mounting member 2.

Each of the cutter positioning units 14 is connected to a respective one of the front and rear chuck units 10, 11, and includes a first sleeve 141 threaded to the fixed ring 115, a second sleeve 142 inserted into the first sleeve 141, a push rod 143 extending into the second sleeve 142, and a spring 144 connected between the first sleeve 141 and the push rod 143 for biasing the push rod 143 outwardly, such that the push rod 143 is biased by the spring 144 to press against a workpiece 500 to be machined, which is mounted in a corresponding one of the front and rear collets 102, 112.

With particular reference to FIGS. 2, 3, and 5, the machining device 400 includes two turret units 401 that are disposed on the machine frame 100 and that are aligned with the front and rear collets 102, 112, respectively. The turret units 401 are operable to machine two workplaces 500 respectively and synchronously. Since the turret units 401 are known in the art, they will not be described in detail.

Figure 8:
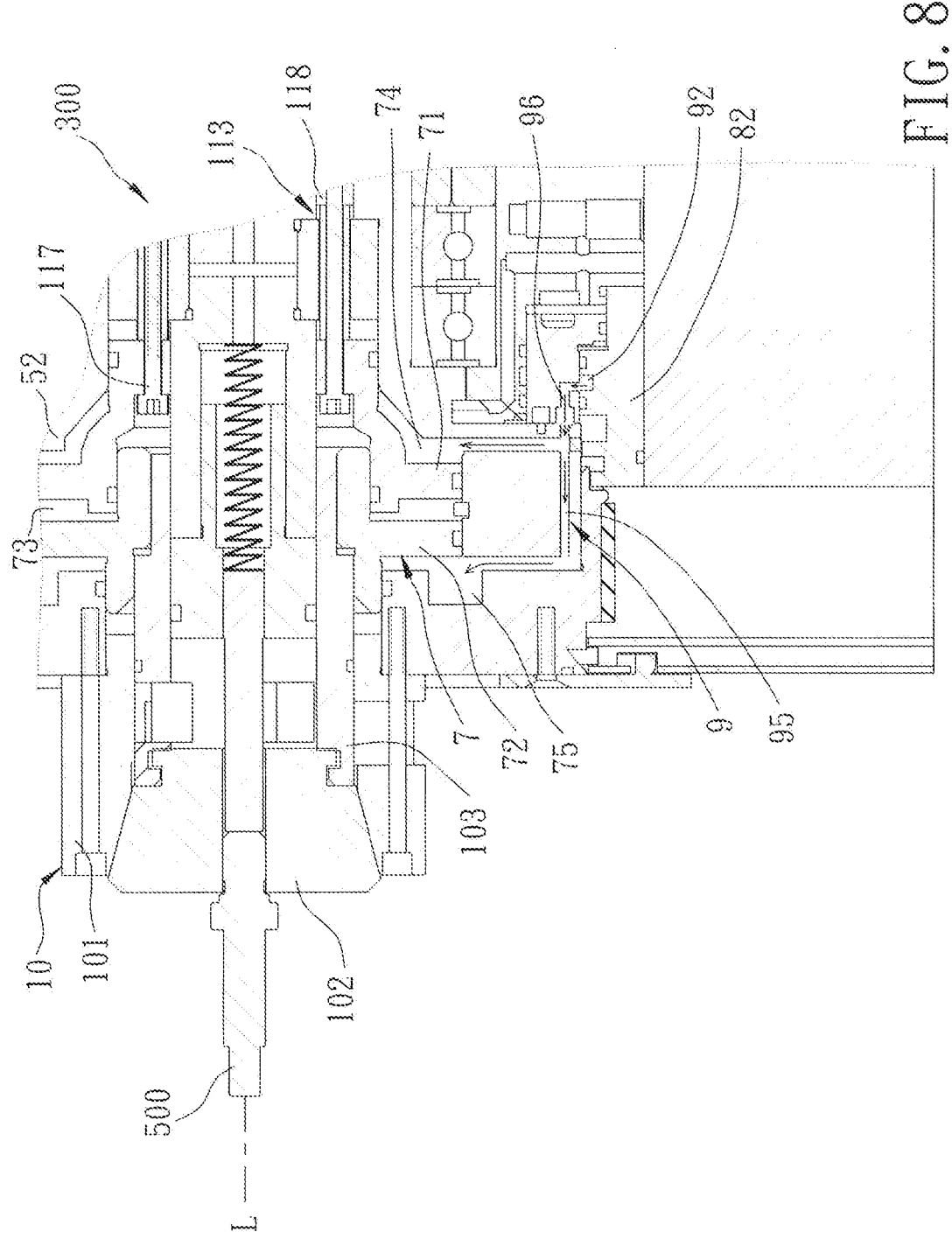
FIG. 8 is an enlarged view of a portion of FIG. 7.

With particular reference to FIGS. 5 and 7, each of the front and rear collets 102, 112 is movable relative to a corresponding one of the front and rear caps 101, 111 between a release position shown in FIGS. 5 and 6 and a clamping position shown in FIGS. 7 and 8.

With particular reference to FIGS. 5 and 6, when each of the front and rear collets 102, 112 is disposed at the release position, oil flows from the first oil hole 91 into the first oil chamber 73 through the second oil passage 94 in the inner cap 81 and the first oil passage 93 in the ring piece 52. At this time, since the first oil chamber 73 is located between the driving ring 72 and the driving sleeve 71, the driving ring 72 and the driving sleeve 71 are moved hydraulically away from each other. Hence, the driving ring 72 moves the front connecting tube 103 forwardly, and the driving sleeve 71 pushes the movable sleeves 116 of the connecting mechanism 113 against a front end of the rear connecting tube 118 to move the rear connecting tube 113 rearwardly. As a consequence, the front and rear connecting tubes 103, 118 are moved away from each other to thereby remove the front and rear collets 102, 112 from the front and rear caps 101, 111, respectively, so as to move each of the front and rear collets 102, 112 to the release position, thereby allowing for replacement of the workpieces 500.

With particular reference to FIGS. 7 and 8, when each of the front and rear collets 102, 112 is disposed at the clamping position, oil flows from the second oil hole 92 into the second and third oil chambers 74, 75 through the fourth oil passage 96 in the inner cap 81 and the third oil passage 95 in the ring piece 52. At this time, since the second and third oil chambers 74, 75 are located at two sides of an assembly of the driving ring 72 and the driving sleeve 71, the driving ring 72 and the driving sleeve 71 are moved hydraulically toward each other. Hence, the driving ring 72 moves the front connecting tube 103 rearwardly, and the driving sleeve 71 pulls the connecting mechanism 113 and the bolts 117 to move the rear connecting tube 113 forwardly. As a consequence, the front and rear connecting tubes 103, 118 are moved toward each other to engage the front and rear collets 102, 112 with the front and rear caps 101, 111, respectively, thereby moving each of the front and rear collets 102, 112 to the clamping position so as to hold the workpieces 500.

In view of the above, the machining equipment of this invention has the following advantages:

1. Since the front connecting tube 103 and the rear connecting tube 118 of the connecting mechanism 113 are driven by the driving ring 72 and the driving sleeve 71, respectively, the front and rear collets 102, 112 can be opened and closed in a synchronous manner. Furthermore, since the front and rear collets 102, 112 are not interconnected by a single rigid body, their opening degrees can be different from each other, thereby allowing the workpieces 500 having different diameters to be held firmly by the front and rear collets 102, 112, respectively, so as to improve the machining precision.
2. The two workpieces 500, which have different diameters, cannot be machined by the above-mentioned conventional chuck device at a time, thereby affecting adversely the operating efficiency. The front and rear collets 102, 112 of the machining equipment of this invention can hold firmly the two workpieces 500 at a time, thereby promoting the production capacity effectively.

With this invention thus explained, it is apparent that numerous modifications and variations can be made without departing from the scope and spirit of this invention. It is therefore intended that this invention be limited only as indicated by the appended claims.

I claim:

1. A chuck device adapted to connect with a driving device, said chuck device comprising:
a mounting member having an accommodating hole centered at an axis;
a fixed seat disposed within said accommodating hole and having an annular portion formed with an axial hole centered at the axis;
a bearing unit disposed within said axial hole in said fixed member;
a connecting member including a rear sleeve extending rotatably through said bearing unit along the axis, and a ring piece extending from a front end of said rear sleeve and having a tapered inner surface;
a transmission member sleeved on and covering said ring piece and adapted to be driven by the driving device to rotate about the axis;
a pressure cylinder unit including a driving sleeve disposed in said connecting member and adjacent to said tapered inner surface, and a driving ring disposed within said ring piece and movable relative to said driving sleeve, said driving sleeve and said driving ring being movable toward and away from each other along the axis, said driving ring cooperating with said ring piece and said driving sleeve to define a first oil chamber, said driving sleeve cooperating with said tapered inner surface to define a second oil chamber, said driving ring cooperating with said transmission member to define a third oil chamber;
an inner positioning unit including an inner cap covering a front end of said ring piece, and an outer cap covering said inner cap and said front end of said ring piece;
an oil path unit including a first oil hole formed in said outer cap, a second oil hole formed in said outer cap, a first oil passage formed in said ring piece and in fluid communication with said first oil chamber, a second oil passage formed in said inner cap and in fluid communication with said first oil passage and said first oil hole, a third oil passage formed in said ring piece and in fluid communication with said second and third oil chambers, and a fourth oil passage formed in said inner cap and in fluid communication with said second oil hole and said third oil passage;
a front chuck unit including a front cap disposed on said transmission member and having a tapered front chuck hole, a front collet disposed in said front chuck hole, and a front connecting tube connected between said front collet and said driving ring; and
a rear chuck unit including a rear cap disposed on said rear sleeve and having a tapered rear chuck hole, a rear collet disposed in said rear chuck hole, and a connecting mechanism disposed in said rear sleeve and connected between said driving sleeve and said rear collet;
wherein each of said front and rear collets is movable relative to a corresponding one of said front and rear caps between a release position, where oil flows into said first oil chamber through said first oil hole to move said driving ring and said driving sleeve away from each other to thereby drive movement of said front connecting tube and said connecting mechanism in opposite directions so as to remove said front and rear collets from said front and rear caps, respectively, and a clamping position, where oil flows into said second and third oil chambers through said second oil hole to move said driving ring and said driving sleeve toward each other to thereby drive movement of said front connecting tube and said connecting mechanism toward each other so as to engage said front and rear collets with said front and rear caps, respectively.

2. The chuck device as claimed in claim 1, wherein said connecting mechanism includes a fixed ring fixed in said rear sleeve, a plurality of equidistant movable sleeves extending through said fixed ring, a plurality of bolts extending respectively and movably through said movable sleeves, and a rear connecting tube having a front end threaded to said bolts, and a rear end connected to said rear collet such that, when each of said front and rear collets is moved from the clamping position to the release position, said driving sleeve is moved rearwardly to press said movable sleeves against said front end of said rear connecting tube to thereby drive rearward movement of said bolts and said rear connecting tube so as to remove said rear collet from said rear cap, and when each of said front and rear collets is moved from the release position to the clamping position, said driving sleeve is moved forwardly to thereby drive forward movement of said bolts and said rear connecting tube so as to engage said rear collet with said rear cap.

3. The chuck device as claimed in claim 2, further comprising two cutter positioning units connected respectively to said front and rear chuck units, each of said cutter positioning units including a first sleeve threaded to said fixed ring, a second sleeve connected to said first sleeve in such a manner that one of said first and second sleeves is inserted into the other of said first and second sleeves, a push rod extending into said second sleeve, and a spring connected between said first sleeve and said push rod for biasing said push rod outwardly.

4. The chuck device as claimed in claim 1, wherein said mounting member has front and rear end surfaces, said chuck device further comprising a front cover disposed on said front end surface of said mounting member, and a rear cover disposed on said rear end surface of said mounting member.

5. Machining equipment comprising:
a machine frame;
a driving device disposed on said machine frame;
a chuck device connected to and driving device and including:
a mounting member having an accommodating hole centered at an axis,
a fixed seat disposed within said accommodating hole and having an annular portion formed with an axial hole centered at the axis,
a bearing unit disposed within said axial hole in said fixed member,
a connecting member including a rear sleeve extending rotatably through said bearing unit along the axis, and a ring piece extending from a front end of said rear sleeve and having a tapered inner surface;
a transmission member sleeved on and covering said ring piece and driven by the driving device to rotate about the axis,
a pressure cylinder unit movable along the axis and including a driving sleeve disposed in said connecting member and adjacent to said tapered inner surface, and a driving ring disposed within said ring piece and movable relative to said driving sleeve, said driving ring cooperating with said ring piece and said driving sleeve to define a first oil chamber, said driving sleeve cooperating with said tapered inner surface to define a second oil chamber, said driving ring cooperating with said transmission member to define a third oil chamber, an inner positioning unit including an inner cap covering a front end of said ring piece, and an outer cap covering said inner cap and said front end of said ring piece, an oil path unit including a first oil hole formed in said outer cap, a second oil hole formed in said outer cap, a first oil passage formed in said ring piece and in fluid communication with said first oil chamber, a second oil passage formed in said inner cap and in fluid communication with said first oil passage and said first oil hole, a third oil passage formed in said ring piece and in fluid communication with said second and third oil chambers, and a fourth oil passage formed in said inner cap and in fluid communication with said second oil hole and said third oil passage, a front chuck unit including a front cap disposed on said transmission member and having a tapered front chuck hole, a front collet disposed in said front chuck hole, and a front connecting tube connected between said front collet and said driving ring, and a rear chuck unit including a rear cap disposed on said rear sleeve and having a tapered rear chuck hole, a rear collet disposed in said rear chuck hole, and a connecting mechanism disposed in said rear sleeve and connected between said driving sleeve and said rear collet, wherein each of said front and rear collets is movable relative to a corresponding one of said front and rear caps between a release position, where oil flows into said first oil chamber through said first oil hole to move said driving ring and said driving sleeve away from each other to thereby drive movement of said front connecting tube and said connecting mechanism in opposite directions so as to remove said front and rear collets from said front and rear caps, respectively, and a clamping position, where oil flows into said second and third oil chambers through said second oil hole to move said driving ring and said driving sleeve toward each other to thereby drive movement of said front connecting tube and said connecting mechanism toward each other so as to engage said front and rear collets with said front and rear caps, respectively; and a machining device including two turret units that are disposed on said machine frame and that are aligned with said front and rear collets, respectively.

6. The machining equipment as claimed in claim 5, wherein said connecting mechanism of said chuck device includes a fixed ring fixed in said rear sleeve, a plurality of equidistant movable sleeves extending through said fixed ring, a plurality of bolts extending respectively and movably through said movable sleeves, and a rear connecting tube having a front end threaded to said bolts, and a rear end connected to said rear collet such that, when each of said front and rear collets is moved from the clamping position to the release position, said driving sleeve is moved rearwardly to press said movable sleeves against said front end of said rear connecting tube to thereby drive rearward movement of said bolts and said rear connecting tube so as to remove said rear collet from said rear cap, and when each of said front and rear collets is moved from the release position to the clamping position, said driving sleeve is moved forwardly to thereby drive forward movement of said bolts and said rear connecting tube so as to engage said rear collet with said rear cap.

7. The machining equipment as claimed in claim 5, wherein said mounting member has front and rear end surfaces, said chuck device further including a front cover disposed on said front end surface of said mounting member, and a rear cover disposed on said rear end surface of said mounting member.

8. The machining equipment as claimed in claim 6, wherein said chuck device further includes two cutter positioning units connected respectively to said front and rear chuck units, each of said cutter positioning units including a first sleeve threaded to said fixed ring, a second sleeve connected to said first sleeve in such a manner that one of said first and second sleeves is inserted into the other of said first and second sleeves, a push rod extending into said second sleeve, and a spring connected between said first sleeve and said push rod for biasing said push rod outwardly.

9. The machining equipment as claimed in claim 5, wherein said driving device includes a driving motor disposed on said machine frame, and a transmission belt connected between said motor and said chuck device.

* * * * *